United States Patent
Eberle et al.

(10) Patent No.: US 12,427,843 B2
(45) Date of Patent: Sep. 30, 2025

(54) FASTENING ARRANGEMENT OF AN ENERGY STORE ON A BODY FLOOR FOR A MOTOR VEHICLE AND MOTOR VEHICLE

(71) Applicant: Bayerische Motoren Werke Aktiengesellschaft, Munich (DE)

(72) Inventors: Niklas Eberle, Munich (DE); Christian Huber, Markt Indersdorf (DE); Olaf Knopp, Kumhausen (DE); Liudmila Lauer, Augsburg (DE); Matthias Sagerer, Munich (DE); Paul Winkler, Munich (DE); Sebastian Zech, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 394 days.

(21) Appl. No.: 17/923,079

(22) PCT Filed: May 3, 2021

(86) PCT No.: PCT/EP2021/061562
§ 371 (c)(1),
(2) Date: Nov. 3, 2022

(87) PCT Pub. No.: WO2021/224178
PCT Pub. Date: Nov. 11, 2021

(65) Prior Publication Data
US 2023/0173905 A1 Jun. 8, 2023

(30) Foreign Application Priority Data
May 4, 2020 (DE) ................ 10 2020 111 920.8

(51) Int. Cl.
*B60K 1/04* (2019.01)
*B62D 21/15* (2006.01)
*B62D 25/20* (2006.01)

(52) U.S. Cl.
CPC .............. *B60K 1/04* (2013.01); *B62D 21/157* (2013.01); *B62D 25/2036* (2013.01); *B60K 2001/0438* (2013.01)

(58) Field of Classification Search
CPC .. B62D 25/20; B62D 25/2036; B62D 25/025; B62D 21/157; B60K 2001/0438; B60K 1/04
See application file for complete search history.

(56) References Cited

U.S. PATENT DOCUMENTS 8,210,301 B2 * 7/2012 Hashimoto .............. B60K 1/04
180/68.5
8,839,895 B2 9/2014 Kato et al.
(Continued)

FOREIGN PATENT DOCUMENTS

CN 105939877 A 9/2016
DE 10 2008 051 786 A1 4/2009
(Continued)

OTHER PUBLICATIONS

International Search Report (PCT/ISA/210) issued in PCT Application No. PCT/EP2021/061562 dated Jun. 23, 2021 with English translation (five (5) pages).
(Continued)

*Primary Examiner* — Gregory A Blankenship
(74) *Attorney, Agent, or Firm* — Crowell & Moring LLP

(57) ABSTRACT

A fastening arrangement of an energy store on a floor of a body for a motor vehicle is provided. The energy store is fastened to the floor of the body, wherein the floor has a central tunnel in which at least a partial region of an exhaust gas system for the motor vehicle runs. A respective storage device of the energy store is arranged on each side of the central tunnel and of the exhaust gas system in the transverse direction of the vehicle. The respective storage device of the energy store is fastened to the floor by means of at least one
(Continued)

respective fixing device in such a manner that, as a result of an accident-induced application of force running in the transverse direction of the vehicle, the fastening of at least one of the storage devices is releasable in a targeted manner and the at least one storage device is thereby shiftable inwards in the transverse direction of the vehicle relative to the floor.

10 Claims, 2 Drawing Sheets

(56) References Cited

U.S. PATENT DOCUMENTS

| | | | |
|---|---|---|---|
| 9,499,205 B1* | 11/2016 | Elia | B60K 6/28 |
| 9,925,890 B2* | 3/2018 | Enning | B60L 50/64 |
| 9,937,818 B2* | 4/2018 | Newman | H02J 7/0045 |
| 10,017,037 B2* | 7/2018 | Newman | H01M 50/271 |
| 10,112,470 B2* | 10/2018 | Hamilton | B62D 25/20 |
| 11,091,017 B2* | 8/2021 | Shin | H01M 50/262 |
| 11,654,762 B2* | 5/2023 | Kohara | B60K 6/26 |
| | | | 180/65.21 |
| 12,134,435 B2* | 11/2024 | Breu | B62D 25/08 |
| 2013/0075173 A1* | 3/2013 | Kato | H01M 50/242 |
| | | | 180/68.5 |
| 2015/0197144 A1 | 7/2015 | Jarocki | |
| 2016/0347160 A1 | 12/2016 | Landgraf | |
| 2018/0194212 A1* | 7/2018 | Hamilton | B60N 2/015 |
| 2018/0334196 A1* | 11/2018 | Erlacher | B60K 1/04 |
| 2020/0062311 A1* | 2/2020 | Kawase | B62D 25/025 |
| 2020/0290445 A1 | 9/2020 | Sawatzki et al. | |
| 2020/0406737 A1 | 12/2020 | Abdyli et al. | |
| 2022/0297522 A1* | 9/2022 | Nicholls | B60L 50/66 |
| 2023/0133645 A1* | 5/2023 | Danneberg | B60K 1/04 |
| | | | 180/68.5 |
| 2023/0173905 A1* | 6/2023 | Eberle | B60K 1/04 |
| | | | 296/187.08 |
| 2024/0092427 A1* | 3/2024 | Nakamura | B62D 25/2036 |

FOREIGN PATENT DOCUMENTS

| | | |
|---|---|---|
| DE | 10 2010 012 109 A1 | 10/2010 |
| DE | 10 2015 100 244 A1 | 7/2015 |
| DE | 10 2015 000 578 A1 | 7/2016 |
| DE | 10 2015 007 754 A1 | 12/2016 |
| DE | 10 2018 100 555 A1 | 7/2019 |
| DE | 10 2018 202 191 A1 | 8/2019 |
| DE | 10 2019 203 042 A1 | 9/2020 |

OTHER PUBLICATIONS

German-language Written Opinion (PCT/ISA/237) issued in PCT Application No. PCT/EP2021/061562 dated Jun. 23, 2021 (five (5) pages).

German-language Search Report issued in German Application No. 10 2020 111 920.8 dated Jan. 31, 2022 with partial English translation (10 pages).

English translation of Chinese-language Office Action issued in Chinese Application No. 202180033129.0 dated Mar. 20, 2025 (7 pages).

* cited by examiner

FASTENING ARRANGEMENT OF AN ENERGY STORE ON A BODY FLOOR FOR A MOTOR VEHICLE AND MOTOR VEHICLE

BACKGROUND AND SUMMARY

The invention relates to a fastening arrangement of an energy store to a body floor for a motor vehicle. The invention further relates to a motor vehicle.

DE 10 2010 012 109 A1 discloses a vehicle having an energy storage unit which is arranged on a body structure of the vehicle. Furthermore, DE 10 2018 100 555 A1 discloses a floor subassembly of a motor vehicle.

An object of the present invention is to provide a fastening arrangement of an energy store on a body floor for a motor vehicle and a motor vehicle so that a particularly advantageous accident behavior can be achieved.

This object is achieved according to the invention by a fastening arrangement and by a motor vehicle, in accordance with the independent claims. Advantageous developments of the invention can be taken from the dependent claims.

A first aspect of the invention relates to a fastening arrangement of an electrical energy store on a floor, which is also referred to as a body floor, of a self-supporting body for a motor vehicle, in particular for a passenger vehicle. By means of the energy store, electrical energy or electric current can be stored. For example, at least one electrical machine of the motor vehicle can be supplied with the electrical energy which is stored in the energy store, whereby the electrical machine can be operated, for example, during engine operation and consequently as an electric motor. For example, the motor vehicle can thereby be electrically driven by means of the electrical machine, in particular only thereby. In the fastening arrangement, the energy store is fixed to the floor of the body. In particular, there is preferably provision for the energy store to be arranged under the floor in the vertical vehicle direction so that, for example, the energy store is at least partially, in particular at least mainly or completely, covered or overlapped upwardly in the vertical vehicle direction by the floor. In the completely produced state of the motor vehicle, for example, the body forms or delimits a passenger compartment, which is also referred to as the interior, of the motor vehicle, in the passenger compartment of which persons, such as, for example, the driver of the motor vehicle, can remain during travel of the motor vehicle. In this case, the passenger compartment is at least partially, in particular at least mainly or completely, delimited downwardly in the vertical vehicle direction by the floor. Since, for example, the energy store is arranged under the floor in the vertical vehicle direction, the energy store is arranged on an outer side of the floor, which side is directed downward in the vertical vehicle direction and which is consequently facing away from the passenger compartment, so that the energy store can be arranged on an underbody which is formed in particular by the floor.

In order to be able to achieve a particularly advantageous accident behavior of the motor vehicle and a particularly great storage capacity of the energy store, there is provision according to the invention for the floor to have a central tunnel-shaped member, in which at least a part-region of an exhaust gas system for the motor vehicle extends. The motor vehicle is consequently preferably in the form of a hybrid vehicle, in particular a plug-in hybrid (PHEV), wherein the motor vehicle in the completely produced state thereof comprises, for example, the above-mentioned electric machine in order to drive the motor vehicle electrically, in particular only electrically, and an internal combustion engine in order to drive the motor vehicle by means of a combustion engine. During combustion operation, the internal combustion engine provides exhaust gas which can flow through the exhaust gas system and consequently through the mentioned part-region of the exhaust gas system. The internal combustion engine has an output shaft which is, for example, in the form of a crankshaft and via which the internal combustion engine can provide torque for driving the motor vehicle. In particular, the internal combustion engine can drive at least or precisely two wheels of the motor vehicle via the output shaft thereof. For example, the internal combustion engine can drive the wheels of the motor vehicle via an articulated shaft which is in the form, for example, of a cardan shaft and which can be at least partially received in the central tunnel-shaped member. The wheels are also referred to as vehicle wheels and are ground contact elements, via which the motor vehicle is or can be supported downwardly on a roadway in the vertical vehicle direction.

In the fastening arrangement according to the invention, there is further provision for a storage device of the energy store to be arranged at both sides of the central tunnel-shaped member and the exhaust gas system in the transverse vehicle direction. This means that at least one or precisely one storage device of the energy store is arranged both at a right side in the transverse vehicle direction and at a left side in the transverse vehicle direction of the central tunnel-shaped member, wherein the electrical energy can be stored by means of or in the storage device. For example, the respective storage device comprises a plurality of individual storage cells, in which the electrical energy can be stored. The respective storage cells of the respective storage device are, for example, electrically connected to each other.

The respective storage device of the energy store is fixed to the floor by means of at least one respective fixing device in such a manner that, as a result of an accident-related force application which extends in the transverse vehicle direction, in particular in an inward direction, the fixing action of at least one of the storage devices brought about by means of the respective fastening arrangement is releasable in a selective manner, whereby the at least one storage device can be displaced inwardly relative to the floor in a transverse vehicle direction. The at least one storage device can thereby be moved or pressed inwardly, in particular locally, against or into the central tunnel-shaped member, also simply referred to as a tunnel, and/or against or into the exhaust gas system as a result of the accident-related force application, whereby, for example, the central tunnel-shaped member or the exhaust gas system becomes deformed.

It is thereby possible in a particularly advantageous manner for accident energy to be converted into deformation energy and consequently absorbed. It is thereby possible to keep the probability that excessive damage may be caused to the energy store particularly low.

A background of the invention is in particular that it is not possible to allow, or there is no provision for allowing, in the fastening arrangement or in the motor vehicle, the energy store to extend over the entire width, running in the transverse vehicle direction, of the floor without any interruption because the floor has the central tunnel-shaped member which is used to store the exhaust gas system and where applicable also the above-mentioned articulated shaft in a favorable manner in terms of structural space. In other words, the central tunnel-shaped member which is also referred to as a body tunnel or a structural space which is delimited by the central tunnel-shaped member is used for the exhaust gas system and where applicable for the articulated shaft. It is thereby impossible to allow the energy store to extend continuously over the entire width of the floor so that it is consequently impossible to provide the energy store in order to form a transverse load path which extends continuously over the entire width of the floor and via which accident forces or accident energy can be guided and supported in the event of a side impact and consequently in the case of a force application which is caused by an accident and which acts inwardly in particular in the transverse vehicle direction. Against this background, the achievement of a satisfactory accident behavior is generally possible only with very high cost expenditure and expenditure of weight.

Against this background, there is now provision according to the invention for the connection of the electrical energy store, which is preferably in the form of a high-voltage store, with respect to the floor to fail or to become detached in a selective manner, whereby an advantageous relative movement between the at least one storage device and the body in particular in the region of the central tunnel-shaped member, also simply called a tunnel, can be carried out. Consequently, the at least one storage device can give way to the accident-related force application so that at the same time both a particularly high level of safety of the energy store and a structural integrity of the body can be ensured. Excessive weight-intensive and cost-intensive measures can consequently be avoided.

It has been found to be particularly advantageous if at least one retention element of the fixing device is associated with the respective storage device, which retention element is constructed separately from the body and separately from the energy store, that is to say, separately from the storage devices. The respective retention element is preferably connected to the body, in particular to the floor. In particular, the retention element can be connected to the body, in particular the floor, in a manner which cannot be released without being destroyed. For example, the retention element is welded to the body, in particular to the floor. In this case, the respective storage device with which the respective retention element is associated is fixed to the respective associated retention element, in particular in a reversibly releasable manner. A particularly advantageous connection of the respective storage device to the floor can thereby be achieved in order to be able to bring about a particularly advantageous accident behavior.

In this case, it has been found to be particularly advantageous if the respective retention element has at least one desired failure location, at which the retention element selectively fails as a result of the accident-related force application, which results in the release of the fixing action of the at least one storage device with respect to the floor. The desired failure location is, for example, a desired breaking location, at which the retention element fails or breaks when the accident-related force application exceeds a predeterminable or predetermined level. The retention element thereby fails selectively during the accident-related force application, whereby the relative movement which advantageously extends particularly in the vertical vehicle direction can be brought about between the at least one storage device and the floor.

Another embodiment is characterized in that the respective storage device is connected to the retention element, in particular in a reversibly releasable manner, by means of at least one respective connection element of the fixing device, which connection element is constructed separately from the energy store, separately from the body and separately from the respective retention element. The respective storage device is thereby fixed to the retention element and via the retention element to the body, in particular the floor. The connection element is, for example, a screw element which is in particular in the form of a screw and by means of which the respective storage device is screwed against the respective retention element and is thereby connected to the retention element. A particularly advantageous connection of the energy store to the floor can thereby be achieved so that a particularly good accident behavior can be achieved.

In this case, it has been found to be particularly advantageous for the respective connection element to have at least one desired failure location, at which the respective connection element selectively fails as a result of the accident-related force application, from which the release of the fixing action results. The advantageous relative movement between the energy store and the floor can thereby be ensured particularly well so that a particularly advantageous accident behavior can be brought about. The explanations above and below in relation to the desired failure location of the retention element can also readily be transferred to the desired failure location of the respective connection element and vice versa.

It is contemplated for the selective release not to be brought about or not only to be brought about by one or more selectively provided desired failure locations. The selective release can be brought about in particular by corresponding selection of a material and/or a wall thickness of the floor, the retention element, the respective storage device and/or the connection element. For example, the connection element which is in particular in the form of a screw has such a diameter that the connection element survives a different accident situation, such as, for example, a front-end collision, without the storage device being released, but fails in the event of a side impact, whereby the storage device is released. With regard to the retention element which is also referred to as a holder, there may be provision for the holder to be connected to the floor via welding locations and/or to have such a wall thickness or wall strength that the holder survives other accident situations, such as a front-end impact, without the storage device being released, but becomes released from the floor and/or destroyed in the event of a side impact, whereby the storage device is released from the floor.

In a particularly advantageous embodiment of the invention, the respective connection element cooperates with the respective storage device in such a manner that the connection element selectively becomes released from the respective storage device, particularly without failing, as a result of the accident-related force application, which results in the release of the fixing action. For example, the connection element tears away from the storage device or is torn out of the storage device as a result of the accident-related force application so that it may consequently result in a relative movement between the respective storage device and the floor in a particularly simple manner. Consequently, the respective storage device can give way to the accident-related force application, whereby a particularly advantageous accident behavior can be brought about.

The respective desired failure location or the selective release, that is to say, cancellation, of the fixing action is carried out particularly when the accident-related force application exceeds a particularly predetermined or predeterminable level. In this case, the selective release or the respective desired failure location can be brought about, for example, by a local wall thickness reduction and/or a local cross section reduction and/or by correspondingly selecting a respective material. In other words, the selective release of the fixing action or the respective failure location can be achieved, for example, by a local weakening, in particular material weakening, and/or by a selective weakening of a connection of two components in such a manner that, for example, the connection or the desired failure location can at a maximum bear a specific load without damage and then fails when the accident-related force application results in a load which is greater than the maximum load. During normal operation, an adequately secure and stable connection of the energy store to the floor can thereby be ensured. If, however, the accident-related force application occurs, the at least one storage device can be selectively released from the floor and can move relative to the floor. The embodiment, in which the respective connection element cooperates with the respective storage device so that the connection element as a result of the accident-related force application is selectively released from the respective storage device, can be produced, for example, in that the storage device has a desired failure location, at which the connection element cooperates with the respective storage device, in particular is supported on the respective storage device. If the accident-related force application exceeds the particularly predeterminable or predetermined level, the desired failure location of the respective storage device fails, in particular breaks, so that the connection element is released from the respective storage device, in particular is torn out of the respective storage device. The respective desired failure location is also referred to as a desired breaking location.

In order to be able to achieve a particularly advantageous accident behavior, in another embodiment of the invention there is provision for the floor to be arranged in the transverse vehicle direction between lateral sills of the body, wherein the respective storage device is connected to the respective lateral sill. In order to achieve a particularly advantageous accident behavior, it has been found to be advantageous for the respective storage device to be at least partially covered or overlapped outwardly in the transverse vehicle direction by the respective lateral sill. It is thereby possible to protect the respective storage device particularly advantageously so that, for example, the probability that excessive damage may be caused to the respective storage device can be kept particularly low.

Finally, another embodiment makes provision for the respective storage device to project outwardly in the transverse vehicle direction beyond the respective lateral sill which is arranged at the same side as the respective storage device. In particular, an energy absorption element of the respective storage device can project outwardly in the transverse vehicle direction beyond the respective lateral sill so that a particularly advantageous accident behavior can be brought about.

According to a preferred embodiment of the fastening arrangement, at least one fixing device which is arranged near or adjacent to the central tunnel-shaped member is configured in a selectively releasable manner. Preferably, however, a fixing device of the storage device is not configured in a selectively releasable manner remote from the central tunnel-shaped member, for example, in the region of the lateral sill.

Preferably, only the fixing device which is located near the central tunnel-shaped member or only the fixing devices which are located near the central tunnel-shaped member, if a plurality of such fixing devices are provided, can be configured in a selectively releasable manner.

The fixing device can be constructed in order to fix the storage device to the central tunnel-shaped member.

The storage device is preferably fixed at the edges thereof at least in the region of the lateral sill or to the lateral sill and in the region of the central tunnel-shaped member or to the central tunnel-shaped member.

A second aspect of the invention relates to a motor vehicle which is preferably in the form of a passenger vehicle and which has at least one fastening arrangement according to the first aspect of the invention. Advantages and advantageous embodiments of the first aspect of the invention may be considered to be advantages and advantageous embodiments of the second aspect of the invention, and vice versa.

Details of the invention will be appreciated below from the description of the drawings.

BRIEF DESCRIPTION OF THE DRAWINGS

Identical or functionally identical elements are indicated in the Figures with the same reference numerals.

DETAILED DESCRIPTION OF THE DRAWINGS

Figure 1:
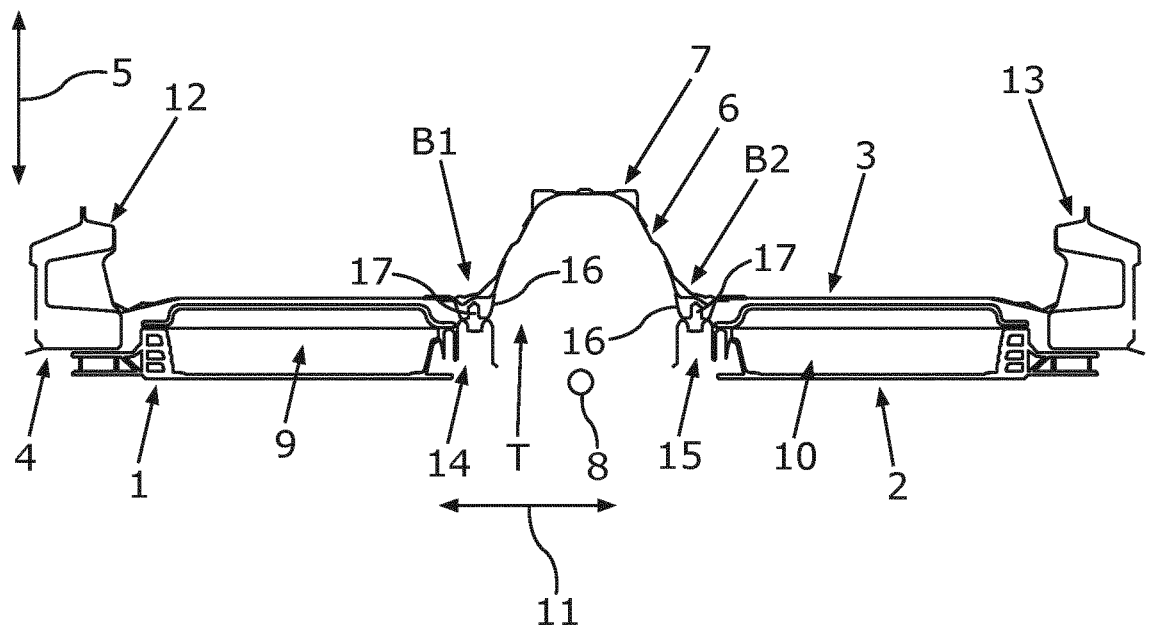
FIG. 1 is a schematic cross sectional view of a fastening arrangement of an electrical energy store with respect to a floor of a body for a motor vehicle according to an embodiment of the invention.

FIG. 1 shows a schematic cross sectional view of a fastening arrangement 1 of an electrical energy store 2 with respect to a floor 3 of a self-supporting body 4 for a motor vehicle, in particular for a passenger vehicle. This means that the motor vehicle in the completely produced state thereof has the self-supporting body 4 and consequently the floor 3 and the energy store 2. The motor vehicle is a hybrid vehicle which further comprises an internal combustion engine for driving the motor vehicle by means of a combustion engine and at least or precisely one electrical machine for driving the motor vehicle electrically, in particular only electrically. Electrical energy or electric current is stored by means of the electrical energy store 2 or in the electrical energy store 2. Since the motor vehicle can be driven by means of the electrical machine, the electrical machine is also referred to as a traction machine. In order to drive the motor vehicle by means of the electrical machine, the electrical machine is supplied with the electrical energy which is stored in the energy store 2. Therefore, the energy store 2 is also referred to as the traction store. The electrical machine and/or the energy store 2 is/are preferably a high-voltage component, the electric voltage, particularly the electrical operating or nominal voltage, of which is preferably at least 48 volt and very preferably greater than 50 volt, in particular greater than 60 volt. Preferably, the electric voltage is several hundred volt. Particularly great electrical power can thereby be achieved in order to drive the motor vehicle electrically, in particular only electrically. As explained in even greater detail below, in the fastening arrangement 1 the energy store 2 is fixed to the floor 3 which is also referred to as the body floor.

The body 4 at least partially delimits a passenger compartment of the motor vehicle which is also referred to as the interior or passenger cab. In this case, the passenger compartment is at least partially, in particular at least mainly or completely, delimited by the floor 3 downwardly in the vertical vehicle direction. The vertical vehicle direction is indicated in FIG. 1 by a double-headed arrow 5. FIG. 1 shows that the floor 3 has a central tunnel-shaped member 6 which is formed in particular by tunnel elements 7 of the floor 3 and consequently of the body 4. The central tunnel-shaped member 6 and consequently the tunnel elements 7 are part of the floor 3 and consequently part of the body 4 which is also referred to as the shell.

The motor vehicle also comprises an exhaust gas system 8 which is illustrated particularly schematically in FIG. 1 and which can be seen as a cutout and through which exhaust gas of the internal combustion machine can flow. FIG. 1 shows that at least one part-region T of the exhaust gas system 8 extends in the central tunnel-shaped member 6. It is further contemplated for at least one shaft, which is not illustrated in the Figures and via which at least or precisely two vehicle wheels of the motor vehicle can be driven by the internal combustion engine, to extend at least partially in the central tunnel-shaped member 6. The shaft is, for example, an articulated shaft, in particular a cardan shaft. In this case, the central tunnel-shaped member 6 is arranged so as to be open downwardly in the vertical vehicle direction and/or completely free from overlapping with respect to the energy store 2 so that the central tunnel-shaped member 6 is not overlapped or covered by the energy store 2, for example, downwardly in the vertical vehicle direction.

In this case, in order to be able to achieve a particularly large storage capacity of the energy store 2, the energy store 2 has at least two storage devices 9 and 10 which can be at least partially, in particular at least mainly or completely, spaced apart from each other, for example, in the transverse vehicle direction. The transverse vehicle direction is indicated in FIG. 1 by a double-headed arrow 11 in this case. For example, the storage devices 9 and 10 are electrically connected to each other. The storage devices 9 and 10 are also referred to as halves of the energy store 2 which is also referred to as a high-voltage store.

FIG. 1 shows that, for example, the storage device 9 is arranged on the left beside the central tunnel-shaped member 6 in the transverse vehicle direction and relative to the forward travel direction or is offset to the left with respect to the central tunnel-shaped member 6, wherein the storage device 10 is arranged on the right beside the central tunnel-shaped member 6 or is offset to the right with respect to the central tunnel-shaped member 6. Consequently, the storage device 9 is also referred to as a left half or left storage device while the storage device 10 is referred to as a right half or right storage device. In other words, one storage device 9 or 10 of the energy store 2 is arranged at both sides of the central tunnel-shaped member 6 and the exhaust gas system 8 in the transverse vehicle direction, wherein the storage device 9 adjoins the central tunnel-shaped member 6 and the exhaust gas system 8 in the transverse vehicle direction toward the left and the storage device 10 adjoins the central tunnel-shaped member 6 and the exhaust gas system 8 in the transverse vehicle direction toward the right.

The floor 3 is arranged in the transverse vehicle direction between lateral sills 12 and 13 of the body 4, which lateral sills are spaced apart from each other in the transverse vehicle direction, wherein the storage device 9 is connected to the lateral sill 12 and the storage device 10 is connected to the lateral sill 13. In this case, the storage device 9 is at least partially covered outwardly in the transverse vehicle direction by the lateral sill 12 and the storage device 10 is at least partially covered outwardly in the transverse vehicle direction by the lateral sill 13. Furthermore, the respective storage device 9 or 10 is secured by means of a respective fixing device 14 or 15 to the floor 3, in particular a respective one of the tunnel elements 7, in such a manner that the fixing action, which is brought about by means of the fixing device 14 or 15, respectively, of at least one of the storage devices 9 and 10 is selectively releasable as a result of an accident-related force application which extends in the transverse vehicle direction, whereby the at least one storage device 9 or 10 can be inwardly displaced relative to the floor 3 in the transverse vehicle direction.

As indicated above, the storage device 9 is generally arranged on the body 4 at a left side and the storage device 10 is arranged at a right side of the central tunnel-shaped member 6 of the floor 3. The side at which the above-mentioned, accident-related force application which results, for example, from a side impact or from crashing into a pole, directly acts is also referred to as the accident side or impact-facing side. If, for example, the accident-related force application acts in the transverse vehicle direction from left to right so that, for example, an accident-causing obstacle directly strikes the left side, the impact-facing side is the left side. If, however, the accident-related force application acts in the transverse vehicle direction from right to left so that, for example, an accident-causing barrier directly strikes the right side, the impact-facing side is the right side. The above-mentioned at least one storage device 9 or 10, the fixing of which to the floor 3 is released as a result of the accident-related force application, is preferably the storage device 9 or 10 arranged on the impact-facing side. The at least one storage device 9 or 10 can move inwardly relative to the floor 3 in the transverse vehicle direction as a result of the accident-related force application and as a result of the fact that the fixing of the at least one storage device 9 or 10 to the floor becomes released, and, for example, is thereby pressed against the exhaust gas system 8 or is pressed into the exhaust gas system 8. As a result, the relatively soft or readily deformable exhaust gas system 8 can become deformed, whereby accident energy can be absorbed particularly advantageously. It is thereby possible to achieve particularly advantageous accident behavior in a manner favorable in terms of weight and costs. The fixing of the at least one storage device 9 or 10 to the floor 3 can be carried out, for example, by the selective failure of a body component, to which the at least one storage device 9 or 10 is connected at least indirectly, particularly directly.

Figure 2:
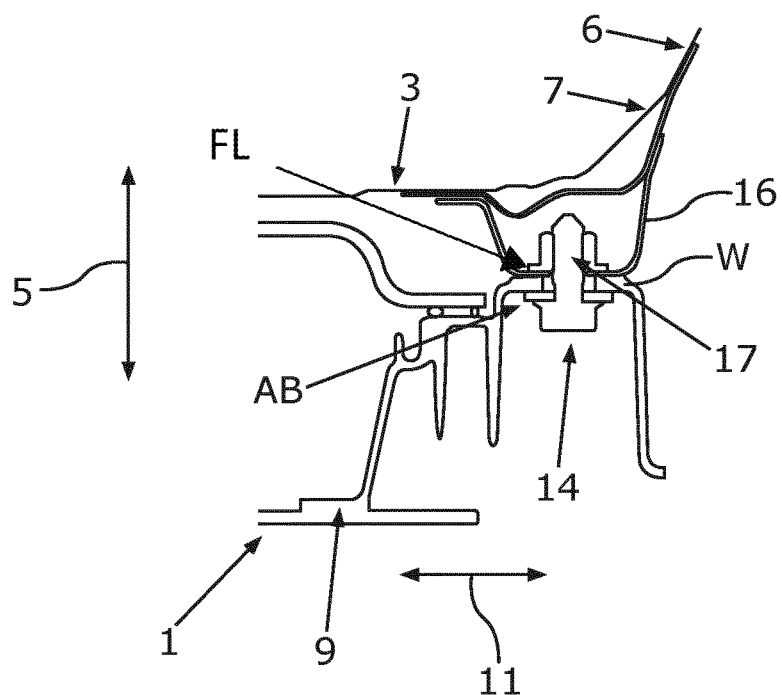
FIG. 2 shows a cutout of an additional schematic cross sectional view of the fastening arrangement.
Figure 3:
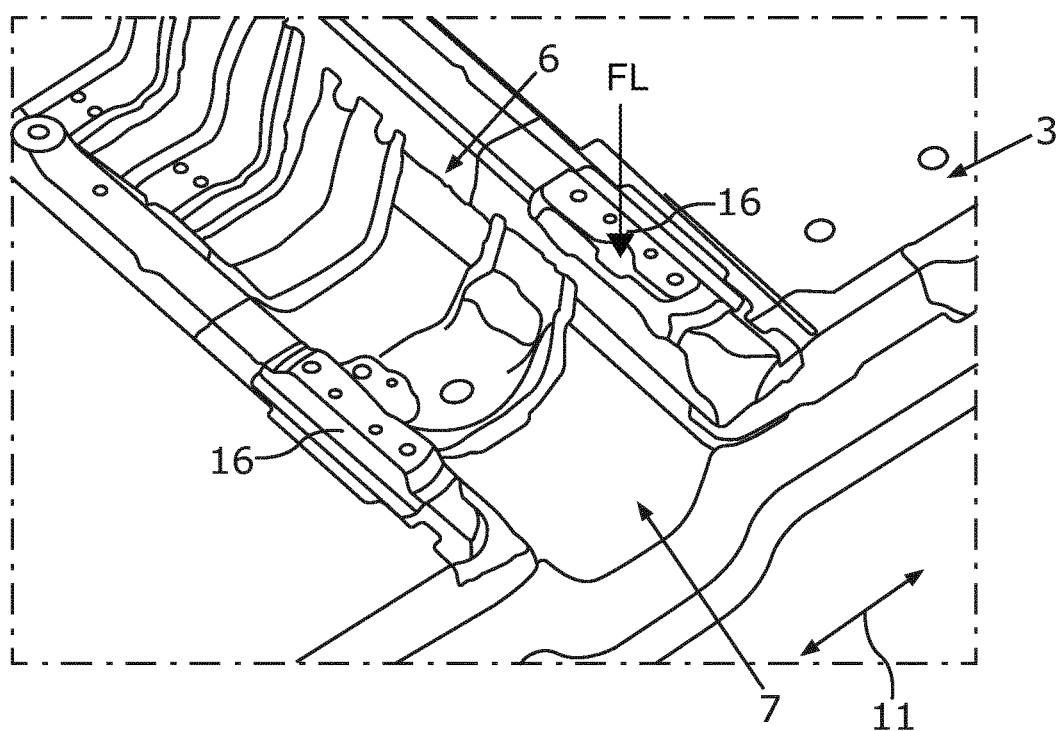
FIG. 3 shows a cutout of a schematic and perspective bottom view of the floor.

FIGS. 2 and 3 show particularly clearly that the respective storage device 9 or 10 is associated with at least one retention element 16 of the respective fixing device 14 or 15, which retention element 16 is constructed separately from the body 4 and separately from the energy store 2 and is connected to the body 4, in particular to the floor 3. The retention element 16 is simply also referred to as a holder or body holder and is, for example, welded to the body 4, in particular to the floor 3 and very particularly to one of the tunnel elements 7. It can be seen particularly clearly that at least one part-region of the central tunnel-shaped member 6 is formed or delimited outwardly in the transverse vehicle direction by the retention elements 16. It is particularly contemplated that the retention element 16 which is associated with the at least one storage device 9 or 10 will selectively fail as a result of the accident-related force application and, as a result, allows the relative movement between the at least one storage device 9 or 10 and the floor. To this end, for example, the respective retention element 16 is less stiff and/or less strong than the tunnel elements 7 or the floor 3. It is particularly contemplated that the respective retention element 16 has at least one desired failure location FL, at which the respective retention element 16 selectively fails as a result of the accident-related force application, which results in the release of the fixing of the at least one storage device 9 or 10 to the floor 3.

The respective retention element 16 is arranged in a respective connection region B1 or B2 or forms at least a portion of the respective connection region B1 or B2, in which the respective storage device 9 or 10 can be connected to the respective retention element 16 or to the floor 3. It is further contemplated that the respective retention element 16 is connected in the respective connection region B1 or B2 to the floor 3.

Alternatively or additionally, it is possible that the respective retention element 16, in particular in the respective connection region B1 or B2, is connected to the body 4, in particular to the floor 3 and very particularly to at least one of the tunnel elements 7, in such a manner that the retention element 16 which is associated with the at least one storage device 9 or 10 is released, in particular without failing, as a result of the accident-related force application selectively from the body 4, in particular from the floor 3 and very particularly from the at least one tunnel element 7 or from the connection region B1 or B2, which results in the release of the fixing of the at least one storage device 9 or 10 to the floor 3. In other words, a selective failure of the respective connection region B1 or B2 is preferably provided for so that the at least one storage device 9 or 10 can give way to the accident-related force application in a particularly effective manner.

FIG. 2 shows particularly clearly that the respective fixing device 14 or 15 has at least one connection element 17 which is constructed separately from the floor 3, separately from the respective retention element 16, and separately from the respective storage device 9 or 10, and which is in the form, for example, of a screw element. By means of the respective connection element 17, the respective storage device 9 or 10 is connected, in particular in a reversibly releasable manner, to the respective retention element 16 and thereby fixed to the respective retention element 16 and thereby to the floor 3. In this case, the respective storage device 9 is screwed, in particular in a reversibly releasable manner, against the respective retention element 16 by means of the respective connection element 17. In this case, it is contemplated that a connection technique, by means of which the respective storage device 9 or 10 is fixed to the retention element 16 or to the floor 3, selectively fails as a result of the accident-related force application. This is intended to be understood in particular to mean that the connection element 17, by means of which the at least one storage device 9 or 10 is fixed to the associated retention element 16, selectively fails as a result of the accident-related force application, which results in the release of the fixing action. To this end, the respective connection element 17 can have at least one or precisely one desired failure location FL, at which the respective connection element 17, by means of which the at least one storage device 9 or 10 is fixed to the associated retention element 16, selectively fails as a result of the accident-related force application, which results in the release of the fixing action.

It is further possible that the respective connection element 17 cooperates with the respective storage device 9 or 10 in such a manner that the respective connection element 17 selectively becomes released from the respective storage device, particularly without failing, as a result of the accident-related force application, in particular is torn out of the respective storage device 9 or 10, which results in the fixing action being released. In particular, the following may be understood thereby.

FIG. 2 shows, using the example of the fixing device 14 and the storage device 9, that the connection element 17 cooperates, for example, with the storage device 9 so as to fix the storage device 9 by means of the connection element 17 to the retention element 16 so that the connection element 17 is supported at least indirectly, in particular directly, on a wall region W and consequently on a support region AB of the storage device 9. The storage device 9 is thereby screwed against the retention element 16 via the wall region W or via the support region AB by means of the connection element 17. The wall region W has in this case, for example, a local weakening or is a local weakening of the storage device 9 so that the wall region W has or can be a desired failure location. As a result of the accident-related force application, for example, the wall region W fails, particularly so that the connection element 17 becomes released from the storage device 9. The fixing of the storage device 9 to the floor 3 or to the retention element 16 is thereby cancelled, which fixing is brought about by means of the connection element 17. Consequently, the storage device 9 can move inwardly in the transverse vehicle direction as a result of the accident-related force application, whereby a particularly advantageous accident behavior can be brought about.

The at least one respective tunnel element 7, to which the respective separate holder is welded for connecting the storage device 9 or 10, is, for example, a body tunnel console. The holder which is welded to this body tunnel console is selectively released from the floor 3 and consequently from the body 4 during the above-described accident-related force application which results, for example, from a side impact or from a crash with a pole, in order to allow a movement, carried out relative to the floor 3, in the direction of the tunnel-shaped member as a result of the at least one storage device 9 or 10. In this case, the holder is configured in such a manner that other requirements or accident situations, such as, for example, a front-end or rear-end impact and a satisfactory operational strength, are complied with.

Alternatively or additionally, the connection element 17 between the respective storage device 9 or 10 and the body tunnel-shaped member can selectively be torn out of the storage device 9 or 10 and/or the connection element 17 itself can fail in order to allow the respective storage device 9 or 10 which is in the form, for example, when viewed alone per se, of a high-voltage store or a high-voltage component, to carry out the described movement which is carried out relative to the floor 3, in the direction of the tunnel-shaped member. A particularly advantageous accident behavior can thereby be achieved, wherein at the same time excessive cost-intensive and weight-intensive measures can be prevented.

LIST OF REFERENCE NUMERALS

1 Fastening arrangement
2 Energy store
3 Floor
4 Body
5 Double-headed arrow
6 Central tunnel-shaped member
7 Tunnel elements
8 Exhaust gas system
9 Storage device
10 Storage device
11 Double-headed arrow
12 Lateral sill 13 Lateral sill
14 Fixing device
15 Fixing device
16 Retention element
17 Connection element
AB Support region
B1 Connection region
B2 Connection region
T Part-region
W Wall region

The invention claimed is:

1. A fastening arrangement of an energy store for a motor vehicle, comprising:
a floor of a body of the motor vehicle, wherein
the energy store is fixed to the floor of the body,
the energy store is arranged under the floor in a vertical vehicle direction,
the floor has a central tunnel-shaped member, in which at least a part-region of an exhaust gas system for the motor vehicle extends;
storage devices of the energy store, wherein a respective storage device of the energy store is arranged at each side of the central tunnel-shaped member and the exhaust gas system in a transverse vehicle direction,
at least one fixing device, by which the respective storage device is fixed to the floor in such a manner that, as a result of an accident-related force application in the transverse vehicle direction, the fixing of at least one of the storage devices is selectively releasable and, thereby, the at least one storage device is displaceable inwardly in the transverse vehicle direction relative to the floor so as to deform the exhaust gas system,
wherein the floor is arranged in the transverse vehicle direction between lateral sills of the body, the respective storage device is connected to a respective lateral sill, and the respective storage device projects outwardly in the transverse vehicle direction beyond a respective lateral sill which is arranged on a same side as the respective storage device.

2. The fastening arrangement according to claim 1, wherein
the respective storage device is associated with at least one retention element of the fixing device, to the retention element of which the associated storage device is fixed, respectively, which retention element is constructed separately from the body and separately from the energy store and is connected to the body.

3. The fastening arrangement according to claim 2, wherein
the respective retention element has at least one desired failure location, at which the retention element selectively fails as a result of the accident-related force application, which results in the release of the fixing.

4. The fastening device according to claim 2, wherein
the retention element is connected to the body such that the retention element is selectively released from the body as a result of the accident-related force application, which results in the release of the fixing.

5. The fastening arrangement according to claim 2, wherein
the respective storage device is connected to the retention element via at least one respective connection element of the fixing device, which connection element is constructed separately from the energy store, separately from the body, and separately from the respective retention element, and is thereby fixed to the retention element and, via the retention element, to the body.

6. The fastening arrangement according to claim 5, wherein
the respective connection element has at least one desired failure location, at which the respective connection element selectively fails as a result of the accident-related force application, which results in the release of the fixing action.

7. The fastening arrangement according to claim 5, wherein
the respective connection element cooperates with the respective storage device such that the connection element selectively becomes released from the respective storage device as a result of the accident-related force application, which results in the release of the fixing action.

8. The fastening arrangement according to claim 1, wherein
the respective storage device is at least partially covered outwardly in the transverse vehicle direction by a respective lateral sill.

9. The fastening arrangement according to claim 1, wherein
at least one fixing device, which is arranged near the central tunnel-shaped member, is configured in a selectively releasable manner, or
only one or all fixing devices, which is/are located near the central tunnel-shaped member, is/are configured in a selectively releasable manner.

10. A motor vehicle comprising a fastening arrangement according to claim 3.

* * * * *